US012433838B2

(12) United States Patent
Dumontet et al.

(10) Patent No.: US 12,433,838 B2
(45) Date of Patent: Oct. 7, 2025

(54) LIPOSOMAL FORMULATION OF BACTERIAL LIPOPOLYSACCHARIDE COMBINED WITH A CYTOTOXIC AGENT, AND USE THEREOF IN ANTI-TUMOUR THERAPY (71) Applicants: Institut National de la Santé et de la Recherche Médicale (INSERM), Paris (FR); Centre National de la Recherche Scientifique (CNRS), Paris (FR); Université Claude Bernard Lyon 1, Villeurbanne (FR); Hospices Civils de Lyon, Lyons (FR); Centre Léon Bérard, Lyons (FR)

(72) Inventors: Charles Dumontet, Venissieux (FR); Abdelkamel Chettab, Lyons (FR)

(73) Assignees: Institut National de la Santé et de la Recherche Médicale (INSERM), Paris (FR); Centre National de la Recherche Scientifique (CNRS), Paris (FR); Université Claude Bernard Lyon 1, Villeurbanne (FR); Hospices Civils de Lyon, Lyons (FR); Centre Léon Bérard, Lyons (FR)

( * ) Notice: Subject to any disclaimer, the term of this patent is extended or adjusted under 35 U.S.C. 154(b) by 50 days.

(21) Appl. No.: 16/760,215

(22) PCT Filed: Oct. 30, 2018

(86) PCT No.: PCT/FR2018/052695
§ 371 (c)(1),
(2) Date: Apr. 29, 2020

(87) PCT Pub. No.: WO2019/086806
PCT Pub. Date: May 9, 2019

(65) Prior Publication Data
US 2021/0177755 A1    Jun. 17, 2021

(30) Foreign Application Priority Data
Oct. 30, 2017  (FR) ..................... 1760209

(51) Int. Cl.
*A61K 31/739*    (2006.01)
*A61K 9/127*     (2006.01)
*A61K 31/7048*   (2006.01)
*A61K 45/06*     (2006.01)
*A61K 47/36*     (2006.01)
*A61P 35/00*     (2006.01)
*C07K 16/28*     (2006.01)

(52) U.S. Cl.
CPC .......... *A61K 9/127* (2013.01); *A61K 31/7048* (2013.01); *A61K 45/06* (2013.01); *A61K 47/36* (2013.01); *A61P 35/00* (2018.01); *C07K 16/2803* (2013.01); *C07K 2317/24* (2013.01)

(58) Field of Classification Search
CPC .... A61K 9/127; A61K 31/7048; A61K 45/06; A61K 47/36; A61K 31/739; A61K 2039/55555; A61K 2039/585; A61K 35/74; A61K 39/39; A61P 35/00; C07K 16/2803; C07K 2317/24
See application file for complete search history.

(56) References Cited

U.S. PATENT DOCUMENTS
5,021,234 A    6/1991   Ehrenfeld

FOREIGN PATENT DOCUMENTS
EP    0 660 714 B1 *    7/2003
JP    S60-155123 A      8/1985
WO    WO-9851217 A1     11/1998
WO    WO-2008063129 A1 * 5/2008 ........... A61K 31/704
WO    WO-2013129936 A1  9/2013
WO    WO-2017035009 A1  3/2017
WO    WO-2019051149 A1 * 3/2019 ........... A61K 39/015

OTHER PUBLICATIONS

Alexander et al., J. Endotoxin Research, vol. 7, No. 3, 2001, 167-202. (Year: 2001).*
Alving et al., *Lipid A and liposomes containing lipid A as antigens and adjuvants*, 26 Vaccine 3036-3045 (2008).
Bakouche et al., *Interleukin 1 Release by Human Monocytes Treated with Liposome-Encapsulated Lipopolysaccharide*, 139(4) The Journal of Immunology 1120-1126 (Aug. 15, 1987).
Boks et al., *In situ Delivery of Tumor Antigen- and Adjuvant-Loaded Liposomes Boosts Antigen-Specific T-Cell Responses by Human Dermal Dendritic Cells*, 135 Journal of Investigative Dermatology 2697-2704 (2015).
Dijkstra et al., *Altered In Vivo Activity of Liposome-Incorporated Lipopolysaccharide and Lipid A*, 57(11) Infection and Immunity 3357-3363 (1989).
Dissanayake et al., *Potential use of a liposome-encapsulated mixture of lipopolysaccharide core types (R1, R2, R3 and R4) of Escherichia coli in controlling colisepticaemia in chickens*, 59 Journal of Medical Microbiology 100-107 (2010).

(Continued)

*Primary Examiner* — Robert S Cabral
(74) *Attorney, Agent, or Firm* — Panitch Schwarze Belisario & Nadel LLP; Erin M. Dunston (57) ABSTRACT

The present invention relates to a pharmaceutical combination product comprising:
a liposomal formulation exclusively containing a LPS; and
at least one cytotoxic compound.
It also relates to its use as an anti-tumour therapy.

15 Claims, 6 Drawing Sheets

(56) References Cited

OTHER PUBLICATIONS

Dumont et al., *Antitumoral Properties and Reduced Toxicity of LPS Targeted to Macrophages via Normal or Mannosylated Liposomes*, 10 Anticancer Research 155-160 (1990).

Jung et al., *Preclinical progress and first translational steps for a liposomal chemotherapy protocol against adrenocortical carcinoma*, 23(10) Endocrine-Related Cancer 825-837 (2016).

Meraz et al., *Multivalent Presentation of MPL by Porous Silicon Microparticles Favors T Helper 1 Polarization Enhancing the Anti-Tumor Efficacy of Doxorubicin Nanoliposomes*, 9(4) PLOS ONE 1-12 (e94703) (Apr. 2014).

Niedhart et al., *Immunization of colorectal cancer patients with recombinant baculovirus-derived KSA (Ep-CAM) formulated with monophosphoryl lipid A in liposomal emulsion, with and without granulocyte-macrophage colony-stimulating factor*, 22 Vaccine 773-780 (2004).

Ravindranath et al., *Attachment of Monophosphoryl Lipid A (MPL) to Cells and Liposomes Augments Antibody Response to Membrane-bound Gangliosides*, 7 Journal of Autoimmunity 803-816 (1994).

Ruyra et al., *A Novel Liposome-Based Nanocarrier Loaded with an LPS-dsRNA Cocktail for Fish Innate Immune System Stimulation*, 8(10) PLOS ONE 1-13 (e76338) (Oct. 2013).

Shahar et al., *Targeted microbeads for attraction and induction of specific innate immune response in the tumor microenvironment*, 28 Vaccine 7279-7287 (2010).

Watson et al., *All-trans retinoic acid potentiates the antibody response in mice to a lipopeptide antigen adjuvanted with liposomal lipid A*, 87 Immunology and Cell Biology 630-633 (2009).

Wong et al., *Liposome potentiation of humoral immune response to lipopolysaccharide and O-polysaccharide antigens of Brucella abortus*, 77 Immunology 123-128 (1992).

Guangyan, *Principles of Immunology*, Shanghai: Shanghai Science and Technology Press 40-42 (Apr. 30, 2007) (abstract provided).

* cited by examiner

LIPOSOMAL FORMULATION OF BACTERIAL LIPOPOLYSACCHARIDE COMBINED WITH A CYTOTOXIC AGENT, AND USE THEREOF IN ANTI-TUMOUR THERAPY

CROSS-REFERENCE TO RELATED APPLICATIONS

This application is a U.S. National Stage Application pursuant to 35 U.S.C. § 371 of International Patent Application PCT/FR2018/052695, filed on Oct. 30, 2018, and published as WO 2019/086806 on May 9, 2019, which claims priority to French Patent Application 1760209, filed on Oct. 30, 2017, all of which are incorporated herein by reference in their entireties for all purposes.

FIELD OF THE INVENTION

The present invention relates to the pharmaceutical field, and more particularly to the oncology field, in particular to the cancer treatment field. More particularly, the present invention relates to a pharmaceutical composition for treating a tumour, this composition being used as such or as an adjuvant composition of another therapeutic compound. The present invention is also related to a pharmaceutical combination product.

STATE OF THE ART

Cancer is a disease characterised by the uncontrolled multiplication of cells within an organism, this multiplication being related to genetic mutations affecting the DNA of its cells. These mutations appear in a spontaneous or induced manner, as the result of an exposure to mutagenic agents, or even have been transmitted in an hereditary way.

Cancer cells of various origins, having an excessive cellular proliferation, give rise to a "tumour", that is a tissue mass tending to persist and grow within the original tissue, and possibly to disseminate in other tissues.

In the case of circulating, in particular blood, cancer cells, these cells are characterised by an anarchical, uncontrolled growth and division capability.

Today, many anti-tumour therapies exist. Without limitation, the available treatments comprise surgical tumour ablation, chemotherapy (administration of cytotoxic drugs for destroying cancer cells), radiation therapy (tumour irradiation), hormone treatments, anti-angiogenic treatments and immunotherapy.

Immunotherapy is a treatment which consists in administrating biological substances, usually produced by the immune system, in order to boost and/or stimulate immune defences of an organism. Indeed, it has been observed that, at the onset of a tumour, the affected organism generates on its own a immune response to this tumour, the tumour cells being recognised as such by the immune system. This immune response is however generally insufficient to get rid of said tumour. The purpose of the immunotherapy is thus to sustain and/or replace this insufficient biological response.

Biological substances used in immunotherapy are for example antibodies, in particular monoclonal antibodies, cytokines, interleukins, interferons and generally any immunostimulant compound.

For each type of tumour, clinicians decide on the treatment(s) to be applied depending on previously validated medical protocols, and each patient's specificities. Currently available treatments can be further improved insofar as none has a full efficiency, nor is adapted to any patient type.

In immunotherapy, studies have been made in order to potentiate beneficial effects of a therapeutic antibody administration. For example, patent application WO 2013/129936 describes the therapeutic use of a combination consisting of an antibody and an immuno-modulator encapsulated in a particulate or vesicular material. The encapsulated immunomodulator is in particular a cytokine wrapped into a liposome, the co-administration of which stimulates beneficial effects of the antibody.

Liposomes

A liposome is an artificial vesicle formed by concentric lipid bilayers, trapping molecules between them. Liposomes are more usually comprised of phospholipids, of a single or several types. These phospholipids are organised in a thermodynamically stable state such that the polar heads are gathered and enable a bilayer to be established. Liposomes are nano-size structures.

Liposomes can retain several types of compounds regardless of whether they are water-soluble (encapsulated in the aqueous phase) or oil-soluble or amphiphilic (packed in the lipid bilayer).

The use of liposomes in the pharmaceutical industry, as a vector for various molecules of biological interest, has been the object of many works and several drugs of this type are currently approved for an intravenous administration.

Indeed, encapsulating active substances into liposomes enables said substances to be protected. It also enables the toxic action of the substances to be limited, and their release rate to be regulated. In addition, liposomes allow passage of water-soluble substances through the hydrophobic membrane of the cells.

Liposomes are increasingly used in therapy as drug vectors. Their primary use is targeting active ingredients.

Bacterial Lipopolysaccharide (LPS)

The bacterial lipopolysaccharide (LPS) is the main component of the external membrane of Gram-negative type bacteria. LPS has high immunostimulatory capabilities: its presence in an organism generates the stimulation of the entire immune system, in particular via the secretion of pro-inflammatory cytokines, in order to respond to the bacterial contamination. Because of this strong immune reaction, injecting LPS in its soluble form can be toxic, or even lethal at a high dose, for a mammalian organism. LPS induces in humans reactions such as hyperthermia, red blood cell aggregation, and septic shock.

The LPS molecule comprises three entities: the lipid A, the nucleus and the antigen O. The lipid A which represents the most toxic LPS part is highly conserved, the nucleus is of very low variability whereas the antigen O is specific to the bacterial species from which comes the LPS.

The action mode and signal pathways of LPS are well known. Its target cells are mainly macrophages, monocytes, granulocytes and epithelial cells. Once released in the organism, the LPS binds to the LBP (LPS Binding Protein) protein synthesised by the liver, which enables its presentation and binding to the membrane receptor CD14 of the monocytes. The LPS is thereby also associated with a membrane co-receptor MD2 and with the receptor TLR 4 in its homodimerised form. The formation of this membrane complex induces activation of the MAP-Kinase pathway and secretion of pro-inflammatory cytokines in the cell.

In basic research, LPS is used in vitro and in vivo, to induce an inflammation related to a strong secretion of pro-inflammatory cytokines by monocyte or macrophage type cells.

In therapy and mainly in prophylaxy, LPS or its entity 'lipid A' is used as a vaccinal adjuvant, to stimulate an immune response targeted against an antigen co-administrated with said LPS.

Liposomal Formulation of LPS

It has been shown that encapsulating LPS into liposomes minimises these pro-inflammatory effects both in vitro and in vivo (Bakouche et al., 1987; Dijkstra et al., 1989).

In anti-tumour therapy, LPS has been used as an adjuvant, to stimulate the immune response to a specific antigen: Neidhart et al. (Vaccine, 2004) have described a treatment method for patients with colorectal cancer, comprising administrating a therapeutic vaccine consisting of a liposomal formulation comprising both a recombinant KSA protein and monophosphoryl lipid A (active component of LPS); most patients treated with this therapeutic vaccine have developed a specific immunity against the KSA protein.

A LPS liposomal formulation has thus already been used within the scope of the preparation of anti-tumour vaccine compositions, the LPS being used for its adjuvant properties. Its co-formulation with an antigen enables the specific immune response against this antigen to be optimised.

However, to date, it has never been contemplated to use LPS as a single active ingredient, in a liposomal formulation, for use in therapy.

Additionally, the association of a liposomal formulation containing exclusively LPS with at least one cytotoxic compound has never been contemplated, as well as the use of said association to treat tumours.

DISCLOSURE OF THE INVENTION

Encapsulating LPS into liposomes enables its toxic effects to be minimised and thus this liposomal formulation to be used in therapy, in particular within the scope of an anti-tumour therapeutic treatment by systemic way.

The present invention relates to a pharmaceutical combination product comprising:
 a liposomal formulation exclusively containing a LPS; and
 at least one cytotoxic compound, as for example a therapeutic antibody or a chemotherapy compound.

The invention also relates to said therapeutic combination product for simultaneous, separate or sequential use as an anti-tumour therapy.

The present invention also relates to a liposomal formulation exclusively containing a bacterial lipopolysaccharide (LPS) for use as an anti-tumour therapy.

More generally, a liposomal formulation exclusively containing a bacterial lipopolysaccharide (LPS) for use as a drug is described.

DESCRIPTION OF THE FIGURES

The control cells have been exposed to the vehicle only, containing neither macrophages nor etoposide.

The apoptosis rate of the cancer cells has been monitored by a labelling with the IncuCyte® Caspase-3/7 compound.

DETAILED DESCRIPTION OF THE INVENTION

The present invention is based on the identification of new immuno-stimulatory properties for the bacterial lipopolysaccharide (LPS). Because of its toxicity, this immunostimulant compound can not be used as such. LPS has already been used as an adjuvant in vaccines, under liposomal formulation containing an antigen and LPS.

The inventors have highlighted the fact that a LPS liposomal formulation, containing no other compounds and in particular no antigen, can be used as a drug, and more particularly that this formulation has therapeutic beneficial effects within the scope of an anti-tumour treatment.

According to a first aspect, the invention relates to a liposomal formulation exclusively containing a bacterial lipopolysaccharide (LPS) for use as a drug.

According to a second aspect, the invention relates to a liposomal formulation exclusively containing a bacterial lipopolysaccharide (LPS) for use as an anti-tumour therapy.

In other words, the present invention relates to a pharmaceutical formulation consisting in a bacterial LPS encapsulated into liposomes, for use in therapy, in particular for use as an anti-tumour therapy.

According to a third aspect, the invention relates to a pharmaceutical combination product comprising:
 a liposomal formulation exclusively containing a LPS, and
 at least one cytotoxic compound.

According to a fourth aspect, the invention relates to said therapeutic combination product, for use as an anti-tumour therapy.

Definitions

For the purposes of the invention, by "cancer", it is meant a pathology characterised by the presence in an organism of cancer cells, formed by transformation of initially normal cells of the organism afflicted by this pathology. A living organism having such cancer cells is diagnosed as being afflicted with cancer. There are approximately 200 different types of cancers, depending on the tissue where the first tumour called a primary tumour is developed.

For the purposes of the invention, by "tumour" it is meant a tissue mass from an excess cell proliferation of cancer cells, this tissue mass tending to persist and grow in a non-regulated and autonomous way towards the organism.

The present invention relates to all types of tumours, but more particularly malignant tumours. Malignant tumours have usually a rapid growth, and have a tendency to relapse after local eradication. Malignant tumours are poorly limited, non-encapsulated, and their perimeters are uneven.

The present invention relates to the treatment of primary tumours and secondary tumours, coming from the metastatic dissemination of a primary tumour.

Tumours are generally classified depending on their original tissue: there are for example skin, bone, or blood cell tumours.

Two main categories of tumours have been defined:
the so-called "solid" tumours are developed in tissues such as skin, mucosae, bones and organs. These are the most frequent tumours: they account for 90% of human cancers.

Among solid tumours, there are carcinomas, coming from epithelial cells (skin, mucosae, glands); and sarcomas, coming from connective tissue cells.

The so-called "liquid" tumours come from blood cells and are not properly tissue excrescences, but are characterised by the presence of cancer blood cells having an anarchical, uncontrolled growth and division capability.

Among liquid tumours, there are leukemias (blood and bone marrow cancers), characterised by the anarchical multiplication of white blood cell precursor cells in the bone marrow; and lymphomas (lymphatic system cancers) which affect lymphocytes.

According to a particular aspect of the invention, the tumour treated is a liquid tumour or a solid tumour.

According to another particular aspect of the invention, the tumour treated is chosen from the group consisting of: a breast tumour, a lung tumour, a skin tumour (melanoma), a blood tumour (leukemia), a bone tumour and a lymphoma.

Cellular Immunotherapy

By "anti-tumour treatment" or "anti-tumour therapy" or "anti-tumour therapy use", it is meant for the purposes of the invention a therapeutic treatment for reducing the volume, inhibiting growth, decreasing agressivity, modifying malignant functional characteristics, and/or get rid of a tumour present in an organism.

To determine and monitor the efficiency of an anti-tumour treatment, an indicative parameter is the progression of the tumour size or volume within the organism, over time. In laboratory animals, the tumour size is most often measured after sacrifying the animals. In patients, the tumour size could be measured in vivo by non-invasive imaging techniques, well known to those skilled in the art.

Figure 1:
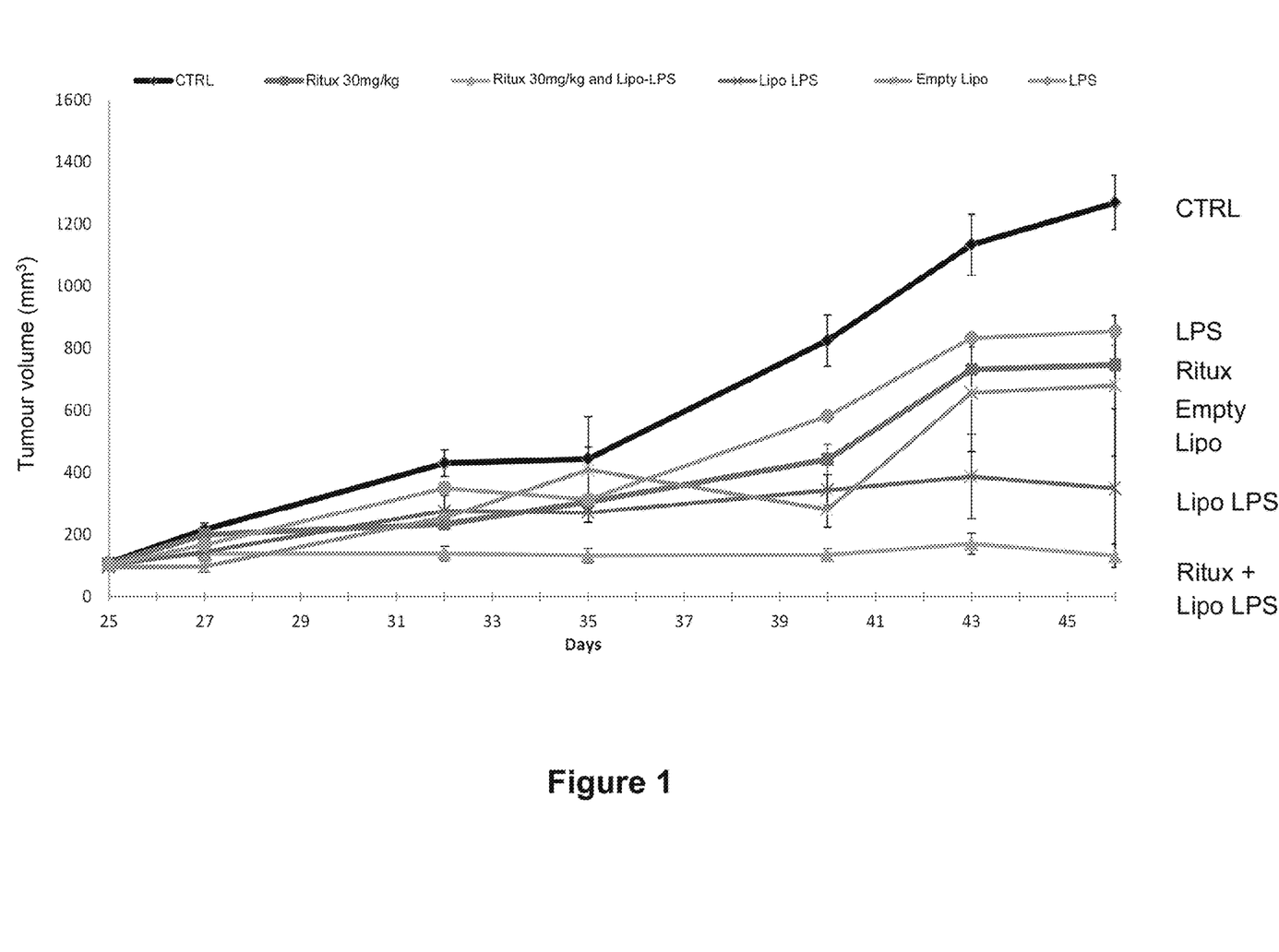
FIG. 1. Monitoring of tumour volumes of lymphoma RL xenografted mice (CD20+ human B lymphoma cells reference ATCC CRL-2261) not treated (control) or treated with non-encapsulated LPS, rituximab, empty liposomes, a LPS liposomal formulation and a combination of rituximab+LPS liposomal formulation.
Figure 5:
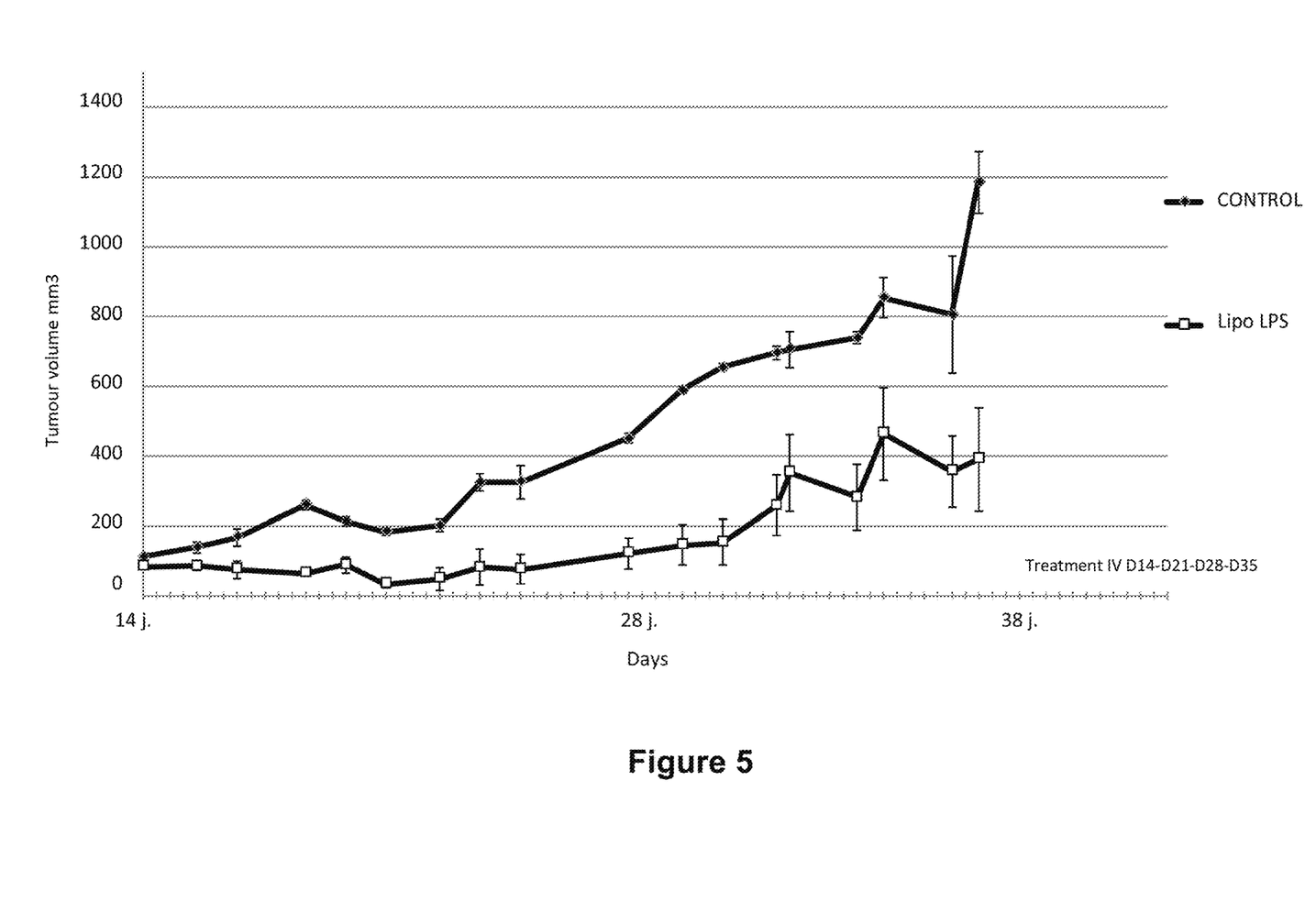
FIG. 5. Monitoring of tumour volumes of MDA-MB-231 cancer cells xenografted scid mice, treated with the LPS liposomal formulation (Lipo LPS, grey curve) or not treated (CONTROL).

As is illustrated in FIGS. 1 and 5, the liposomal formulation exclusively containing a LPS enables the development of a human tumour xenografted in mice to be significantly reduced, in comparison with the tumour development observed in control, untreated mice.

FIG. 1 shows the results obtained with mice xenografted with RL lymphoma cells, and FIG. 5 shows the results obtained with mice having breast cancer tumours (formed from MDA-MB361 cells).

The present invention relates in particular to a liposomal formulation exclusively containing a LPS for use as an immunotherapy agent.

The present invention also relates to a liposomal formulation exclusively containing a LPS for use as an agent stimulating the innate immune system.

More particularly, the present invention relates to a liposomal formulation exclusively containing a LPS for use as an anti-tumour cell immunotherapy agent.

Immunotherapy is a therapeutic approach consisting in stimulating internal immune functions of an organism afflicted with a cancer, for the immune system of the organism to be capable of inhibiting growth or even get rid of a tumour developing therewithin.

Among immune operators involved in the recognition and destruction of cancer cells, the 'Natural Killer' cells designated NK cells hereinafter can be mentioned. These are lymphocytes capable of recognising a tumour tissue, infiltrating it and exerting a specific cytotoxicity to tumour cells.

The anti-tumour cellular immunotherapy is a therapeutic approach consisting in stimulating NK cells, their development and/or activity, such that they recognise and lyse tumour cells.

Figure 2:
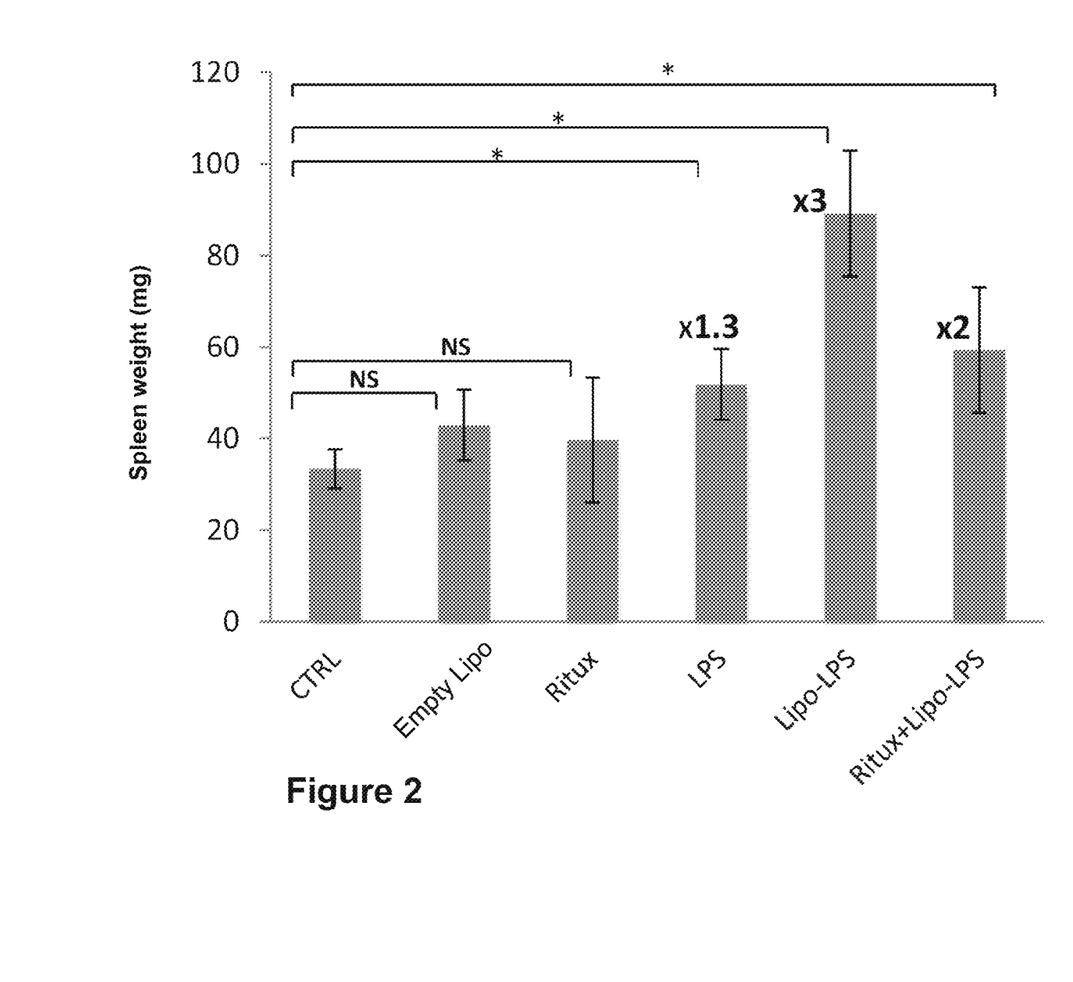
FIG. 2. Weights of treated mice spleens: control mice (CTRL), treated with empty liposomes (Empty-Lipo), treated with the antibody Rituximab (Ritux), treated with non-encapsulated LPS (LPS), treated with a LPS liposomal formulation (Lipo-LPS), and treated with a combination of antibodies Rituximab and a LPS liposomal formulation (Ritux+Lipo-LPS).
Figure 3:
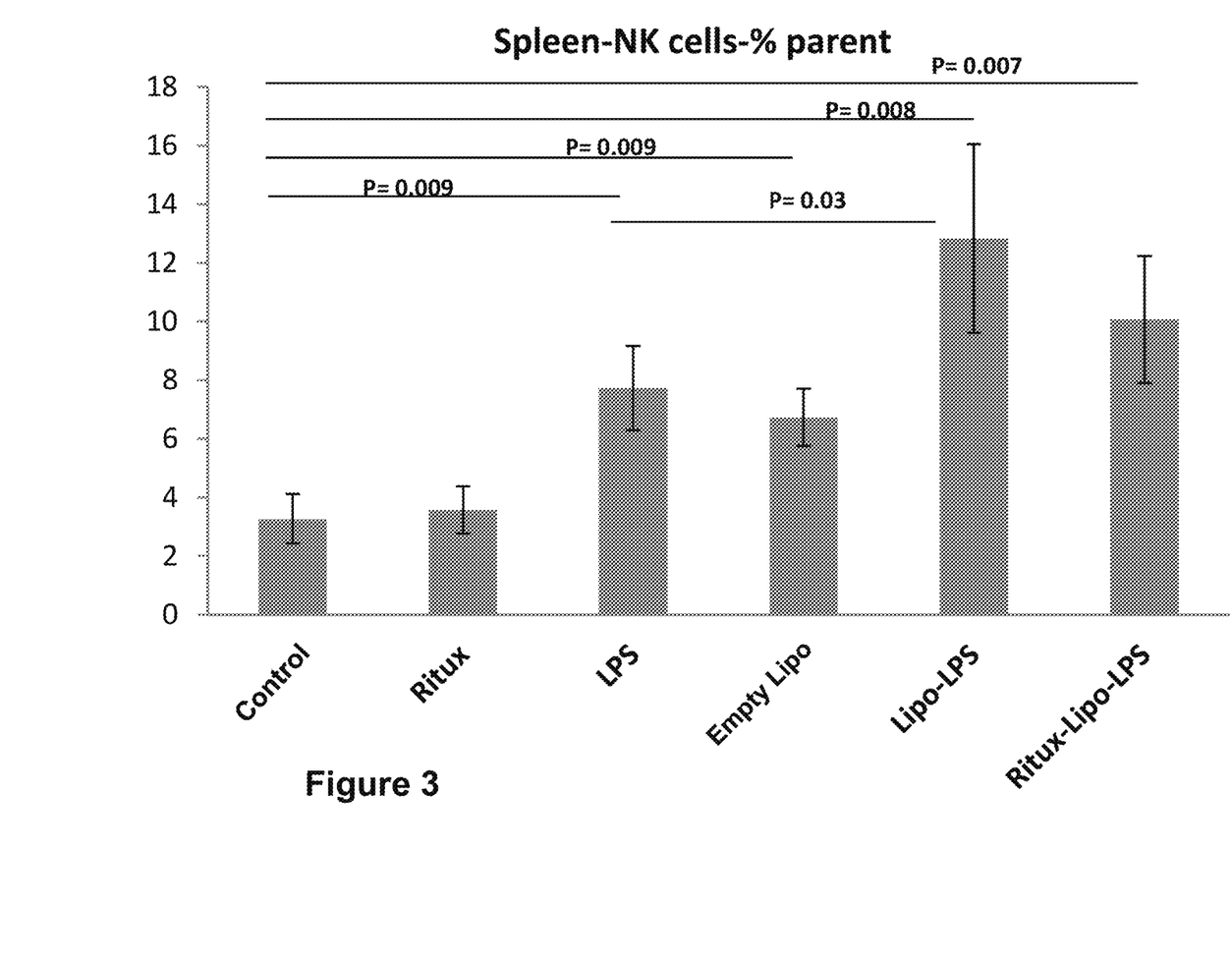
FIG. 3. Amount of NK cells in treated mice spleens: control mice (control), treated with the antibody Rituximab (Ritux), treated with non-encapsulated LPS (LPS), treated with empty liposomes (Empty-Lipo), treated with a LPS liposomal formulation (Lipo-LPS), and treated with a combination of antibodies Rituximab and a LPS liposomal formulation (Ritux+Lipo-LPS).

As is illustrated in FIGS. 2 and 3, the administration to mice of a liposomal formulation exclusively containing a LPS significantly increases the number of NK cells present in the animal spleen.

Thus, it appears that a liposomal formulation exclusively containing a LPS stimulates multiplication of NK cells, and thus acts as a cellular immunotherapy agent, by promoting the cytotoxic cellular response to the tumour cells.

Liposomal Formulation

For the purposes of the invention, a liposomal formulation designates a composition comprising liposomes encapsulating an active ingredient, said active ingredient being designated as being "encapsulated" or even "contained in a liposomal formulation".

In the present application, the terms "LPS liposomal formulation", "liposomal formulation exclusively containing a LPS", "liposomes-LPS" and "LPS encapsulated in liposomes" are used indifferently and all of them designate the same formulation as defined above, namely a formulation/composition consisting of liposomes encapsulating a bacterial lipopolysacharide.

The liposomes, also designated as liposomal particles, are vesicles in which a lipid phase consisting of a bilayer of amphiphilic molecules, such as phospholipids or cholesterol, traps an aqueous inner phase.

Unilamellar liposomes, which comprise a single lipid bilayer are differentiated from multilamellar liposomes which comprise several concentric lipid bilayers.

Phospholipids are lipids comprising a 'phosphoric acid' group. These are lipids consisting of a polar (hydrophilic) "head" and two aliphatic (hydrophobic) "tails". This family includes in particular phosphatidic acids and phosphoglycerides. The physico-chemical properties of phospholipids depend both on the nature of the polar molecule of the hydrophilic head, and the nature of the aliphatic chains (fatty acids) of their hydrophobic tails.

For the preparation of the liposomal formulation according to the invention, different types of phospholipids can be used.

For example, liposomal formulations shown in patent application WO 2013/129936 are suitable for implementing the present invention.

Without limitation, the following phospholipids could be used in combination:
- 'DOPE' which designates 1,2-Dioleoyl-sn-Glycero-3-Phosphoethanolamine;
- 'DSPE' which designates 1,2-distearoyl-sn-glycero-3-phosphoethanolamine or distearoylphosphatidylethanolamine;
- 'PEGXXXX' which designates polyethylene glycol, with XXXX indicating the molecular weight thereof; in particular PEG350 and PEG5000 can in particular be used;
- 'DSPE-PEGXXXX' which designates 1,2-distearoyl-sn-glycero-3-phosphoethanolamine-N-[methoxy-(polyethylene glycol)-XXXX].
- cholesterol (3β-Hydroxy-5-cholestene, 5-Cholesten-3β-ol).

According to a particular implementation of the invention, the liposomal formulation consists of phospholipids with the composition: DOPE:DSPE-PEG 5000:DSPE-PEG-350:Cholesterol (54:8:8:30% mol).

According to another particular implementation of the invention, the liposomal formulation consists of phospholipids with the composition:
- 18:1 (delta9-Cis) DSPE (DOPE)
- 18:0 PEG5000 DSPE (ammonium salts)
- 18:0 PEG350 DSPE (ammonium salts), and
- Cholesterol.

Bacterial Lipopolysaccharide (LPS)

The liposomal formulation according to the invention exclusively contains a bacterial lipopolysaccharide, namely contains no other active compound, and in particular contains no antigen, except for the antigen O being a component of LPS.

Within the scope of the present invention, LPS is used as an agent stimulating the innate immune system, and not as an adjuvant enabling the specific immune response to a particular antigen to be increased.

LPS, a component of the external membrane of Gram-negative bacteria, comprises three molecular entities bound to each other by covalent bonds:
- lipid A;
- the "nucleus" consisting of an oligosaccharide;
- and the antigen O.

The lipid A which is the most immunostimulatory part of LPS is highly conserved from one bacterial species to the other, the nucleus is of a very low variability, and the antigen O is specific to the bacterial species from which comes the LPS.

Without limitation, Gram-negative bacteria comprise in particular the following families:
- Enterobacteriaceae family:
  - *Salmonella* genus
  - *Escherichia* genus, for example *Escherichia coli*
  - *Yersinia* genus
- Vibrionaceae family:
  - *Vibrio* genus example: Vibriocholerae (responsible for cholera)
- Pseudomonadaceae family:
  - *Pseudomonas* genus
- Neisseriaceae family
  - *Neisseria* genus example: *Neisseria meningitidis* (responsible for the bacterial meningitis)
- Rhizobiaceae family
  - *Agrobacterium* genus example: *Agrobacterium tumefaciens*
  - *Rhizobium* genus example: *Rhizobium rhizogenes*
- Alcaligenaceae family
  - *Bordetella* genus According to a particular implementation of the invention, the LPS contained in the liposomal formulation comes from a bacterium of the Enterobacteriaceae family, excluding the *Salmonella enterica* species.

According to another particular implementation of the invention, the LPS contained in the liposomal formulation comes from a bacterium of the Enterobacteriaceae family, in particular of the *Escherichia* genus, and in particular of *Escherichia coli* species.

The phrase "LPS from a bacterium" indicates that said LPS molecule has the physico-chemical characteristics of the LPS naturally occurring in the external membrane of said bacterium. The characteristics are in particular the nature of fatty acids constituting the lipid A.

The LPS can be a naturally occurring LPS or a synthetic LPS.

More particularly, a naturally occurring LPS can be purified from a bacterial membrane, by techniques well known to those skilled in the art, or even can be obtained in a purified form from a company such as SIGMA-ALDRICH.

A synthetic LPS could be obtained by any synthesis technique known to those skilled in the art.

The LPS used can be encapsulated in liposomes in its entire form (lipid A+nucleus+antigen O) or in an incomplete form, only a LPS fraction being used.

According to a particular aspect of the invention, the LPS encapsulated is used as an incomplete form, that is in the form of a LPS fraction. More particularly, the LPS exclusively consists of its antigen O, or its lipid A, or even a combination of both.

The lipid A of the LPS from the bacterial species *Escherichia coli* is a β-1-6 glucosamine dimer.

More particularly, the LPS encapsulated can consist of its lipid A used in the form of monophosphoryl lipid A.

It is intended that LPS can be modified, in particular in order to inhibit or potentiate its immunostimulatory properties. The LPS could also be a LPS that underwent a modification for the purposes of modifying its solubility or toxicity properties.

According to a particular aspect of the invention, in the liposomal formulation for use in therapy, in particular in anti-tumour therapy, the LPS encapsulated in the liposomes is a modified LPS.

Preparation and Characterisation of the LPS Liposomal Formulation

Any technique known to those skilled in the art can be used to prepare a liposomal formulation exclusively containing a LPS.

It is intended that the phrase "exclusively a LPS" indicates that the liposomal formulation only comprises LPS molecules, excluding any other active compound and/or antigen.

The LPS encapsulated comes from some bacterial species, for example comes from *Escherichia coli*.

According to a particular implementation of the invention, said formulation exclusively comprises LPS molecules, wherein these molecules can be of different bacterial origins: thus, this can be one, two, three or even more LPS of different bacterial origins. For example, the liposomal formulation can comprise a LPS from *E. coli*, a LPS from a bacterium of the *Salmonella* genus and a LPS from a bacterium of the *Pseudomonas* genus, said LPS molecules being in a complete or incomplete form.

In other words, the pharmaceutical formulation consists of at least one bacterial LPS encapsulated in liposomes.

As is shown in the section of examples, the phrase "liposomal formulation exclusively containing a LPS" indicates that the LPS is properly incorporated/encapsulated in the liposomal particles, and not that there is just a simple juxtaposition in a medium here.

According to a particular aspect, the method for preparing the liposomal formulation comprises successive freeze/thaw steps.

According to another aspect of the invention, the method for preparing the liposomal formulation comprises a step of sterilising the liposomal formulation.

According to yet another aspect of the invention, the method for preparing the liposomal formulation comprises a step of filtering liposomes, in order to obtain liposomal particles with a homogeneous size.

According to a preferred aspect of the invention, said liposomal formulation consists of liposomal particles with a homogeneous size.

According to a preferred implementation of the invention, the liposomal formulation is suitable for systemic administration.

Pharmaceutical Composition

The present invention also relates to a pharmaceutical composition comprising, in an acceptable pharmaceutical medium, at least one liposomal formulation exclusively containing a lipopolysaccharide.

In other words, said pharmaceutical composition comprises, in a pharmaceutically acceptable medium, at least one liposomal formulation consisting of a bacterial lipopolysaccharide encapsulated in liposomes.

For the purposes of the invention, a pharmaceutically acceptable medium designates a vehicle enabling the liposomal formulation to be preserved and administrated, and optionally excipients, the administration of which to an individual or animal is not accompanied with significant deleterious effects, and which are known to those skilled in the art.

A pharmaceutical composition according to the invention can comprise any pharmaceutical excipient necessary, such as buffer agents or agents to adjust pH or isotonicity, or even wetting agents. A pharmaceutical composition according to the invention can also comprise one or more anti-oxidant agents, and/or one or more preservatives.

A liposomal formulation, or a pharmaceutical composition as described above, can be administrated by any suitable way, such as the oral, buccal, sublingual, ophthalmic, rectal, topical way, or by parenteral way, in particular by an intraperitoneal, intradermal, subcutaneous, intravenous or intramuscular way.

According to a preferred implementation of the invention, the liposomal formulation or the pharmaceutical composition as described above is adapted to a systemic administration.

A pharmaceutical composition according to the invention can be formulated for an oral administration, as a tablet, a capsule or a hard gelatine capsule, with a sustained or controlled release, a pill, a powder, a solution, a suspension, a syrup or an emulsion.

According to another embodiment, a pharmaceutical composition according to the invention can be prepared for a parenteral administration, as an injectable.

A pharmaceutical composition according to the invention can be sterilised by any known conventional method, such as filtration. The resulting aqueous solution can be conditioned to be used as such, or be lyophilised. A lyophilised preparation can be combined with a sterile solution before use.

According to a preferred implementation of the invention, the pharmaceutical composition comprises an efficient amount of a liposomal formulation exclusively containing a LPS.

An efficient amount of such a formulation corresponds to an amount which induces the desired response, that is a therapeutic effect, and more specifically an anti-proliferative effect to tumour cells. The efficient amount can depend on a parameter or a plurality of parameters, such as the administration way, the single dose or multiple dose administration, the patient's characteristics, which encompasses age, physical condition, height, weight and the presence of conditions in addition to that treated. These parameters and their influences are well known to those skilled in the art and can be determined by any known method.

The present invention also relates to said pharmaceutical composition, for use as a drug, and more particularly for use as an anti-tumour therapy.

Administration

The liposomal formulation exclusively containing a LPS, or a pharmaceutical composition comprising it, for use as an anti-tumour therapy, could be administrated to a patient with cancer according to any techniques known to those skilled in the art.

In particular, said liposomal formulation or pharmaceutical composition comprising it could be administrated in one dose, or multidose on a continuous period.

According to a particular aspect of the invention, the liposomal formulation for use as described above, or a pharmaceutical composition comprising it, is administrated once weekly to a patient with cancer.

According to a preferred implementation of the invention, said liposomal formulation for use as described above is administrated by systemic pathway, that is the formulation will travel the blood pathway of the patient to reach its target cells. More precisely, said liposomal formulation could be administrated by the digestive pathway or parenteral pathway.

The present invention also relates to a method for therapeutic treating a tumour, comprising administrating to a patient having said tumour, an efficient amount of a liposomal formulation exclusively containing a LPS.

Pharmaceutical Combination Product

According to a third aspect, the invention relates to a pharmaceutical combination product comprising:
  a liposomal formulation exclusively containing a LPS; and
  at least one cytotoxic compound.

For the purposes of the invention, a pharmaceutical combination product designates a set of therapeutic agents used together for the treatment of one pathology, wherein their administration can be simultaneous, separate or sequential. Thus, the therapeutic agents can be either mixed in one therapeutic composition, or be present in one kit but administrated in a completely separate, or sequential way.

The liposomal formulation exclusively containing a LPS will be such as previously defined, and could be in particular:
  a formulation containing a LPS from a bacterium of the Enterobacteriaceae family, in particular of the *Escherichia* genus, and in particular of the *Escherichia coli* species; and/or a formulation containing a LPS exclusively consisting of its lipid A.

As previously discussed, a LPS liposomal formulation can be used in therapy either as such, or be combined to another therapeutic agent. This other therapeutic agent is in particular a cytotoxic compound, that is a compound inducing the cell death on cells on which it works.

Advantageously, the cytotoxic compounds are adapted to specifically target some cells, in particular to target the cancer cells.

According to one implementation of the invention, said cytotoxic compound is an immunotherapy agent, such as peptides or non-peptide small molecules having an immunomodulatory and cytotoxic activity; more preferentially, the immunotherapy agent is a therapeutic antibody.

A therapeutic antibody is an antibody capable of specifically recognising cells to be destroyed, in the case of cancer, this is naturally tumour cells. Tumour cells express antigens at their membrane surface, which can be recognised by antibodies directed thereto. The therapeutic antibodies can be coupled to a toxic substance, be capable of inducing lysis and thus death of the tumour cell recognised by the antibody. The therapeutic antibodies can also act by blocking some receptors at the membrane surface of the tumour cells.

These therapeutic antibodies are increasingly used within the scope of anti-tumour therapies. For example, rituximab, a monoclonal antibody specifically binding to the transmembrane antigen CD20, a protein located on the B lymphocytes and expressed in more than 95% of the B cells of the non-Hodgkin lymphoma, can be mentioned. This therapeutic antibody is indicated for treating patients with stage III-IV follicular lymphomas. Trastuzumab, specific to the HER-2 receptor over-expressed by some tumour cells of breast cancer can also be mentioned.

According to a particular implementation of the invention, the therapeutic antibody contained in the combination product is a monoclonal antibody.

According to another particular implementation of the invention, the therapeutic antibody contained in the combination product is a polyclonal antibody.

According to an implementation of the invention, the therapeutic antibody target is chosen from the group consisting of: CD20, CD52, CD3, CD4, CD5, CD8, CD19, CD22, CD38, CD138, HER2, ErbB2, CD1, CD30, CD33, CD52, CD25, vascular endothelial growth factor (VEGF), endothelial growth factor receptor (EGFR), Insulin-like growth factor receptor 1 (IGF1) and CTLA-4.

According to yet another implementation of the invention, the therapeutic antibody is chosen from the group of antibodies consisting of: abciximab, adalimumab, alemtuzumab, atlizumab, basiliximab, belimumab, bevacizumab, brentuximab vedotin, canakinumab, cetuximab, certolizumab pegol, cixutumumab, daclizumab, denosumab, eculizumab, efalizumab, gemtuzumab, golimumab, ibritumomab tiuxetan, infliximab, ipilimumab (MDX-101), muromonab-CD3, natalizumab, necitumumab, obinutuzumab (GA-101), ocaratuzumab (AME-133v), ocrelizumab, ofatumumab, omalizumab, palivizumab, panitumumab, pertuzumab, PR0131921, ranibizumab, rituximab, SBI-087, tocilizumab, TRU-015, tositumomab, trastuzumab, veltuzumab, and any combination of these antibodies.

It is intended that for the purposes of the invention, the combination product contains at least one therapeutic antibody, and that it can thus comprise a combination of several therapeutic antibodies.

According to another implementation of the invention, the therapeutic antibody is chosen from the group consisting of antibodies used in anti-tumour therapeutic applications, and in particular consisting of the following antibodies: alemtuzumab, belimumab, bevacizumab, brentuximab vedotin, canakinumab, cetuximab, cixutumumab, daclizumab, denosumab, gemtuzumab, golimumab, ibritumomab tiuxetan, ipilimumab (MDX-101), muromonab-CD3, natalizumab, necitumumab, obinutuzumab (GA-101), ocaratuzumab (AME-133v), ocrelizumab, ofatumumab, panitumumab, pertuzumab, PR0131921, ranibizumab, rituximab, SBI-087, tocilizumab, TRU-015, tositumomab, trastuzumab, veltuzumab, and any combination of these antibodies.

According to a preferred implementation of the invention, the therapeutic antibody is an anti-CD20 monoclonal antibody, and preferably is rituximab.

The experimental results shown in FIG. 1 show that:
in untreated mice having a tumour, the tumour volume increases over time;
if the mice are treated by administration of rituximab, the tumour volume still increases over time, but said volume is twice lower, 46 days after the tumour graft, than the tumour volume in control mice;
if the mice are treated with a combination product comprising rituximab and a LPS liposomal formulation, the tumour volume is identical 23 days and 46 days after grafting: the tumour development is thus completely inhibited.

Figure 4:
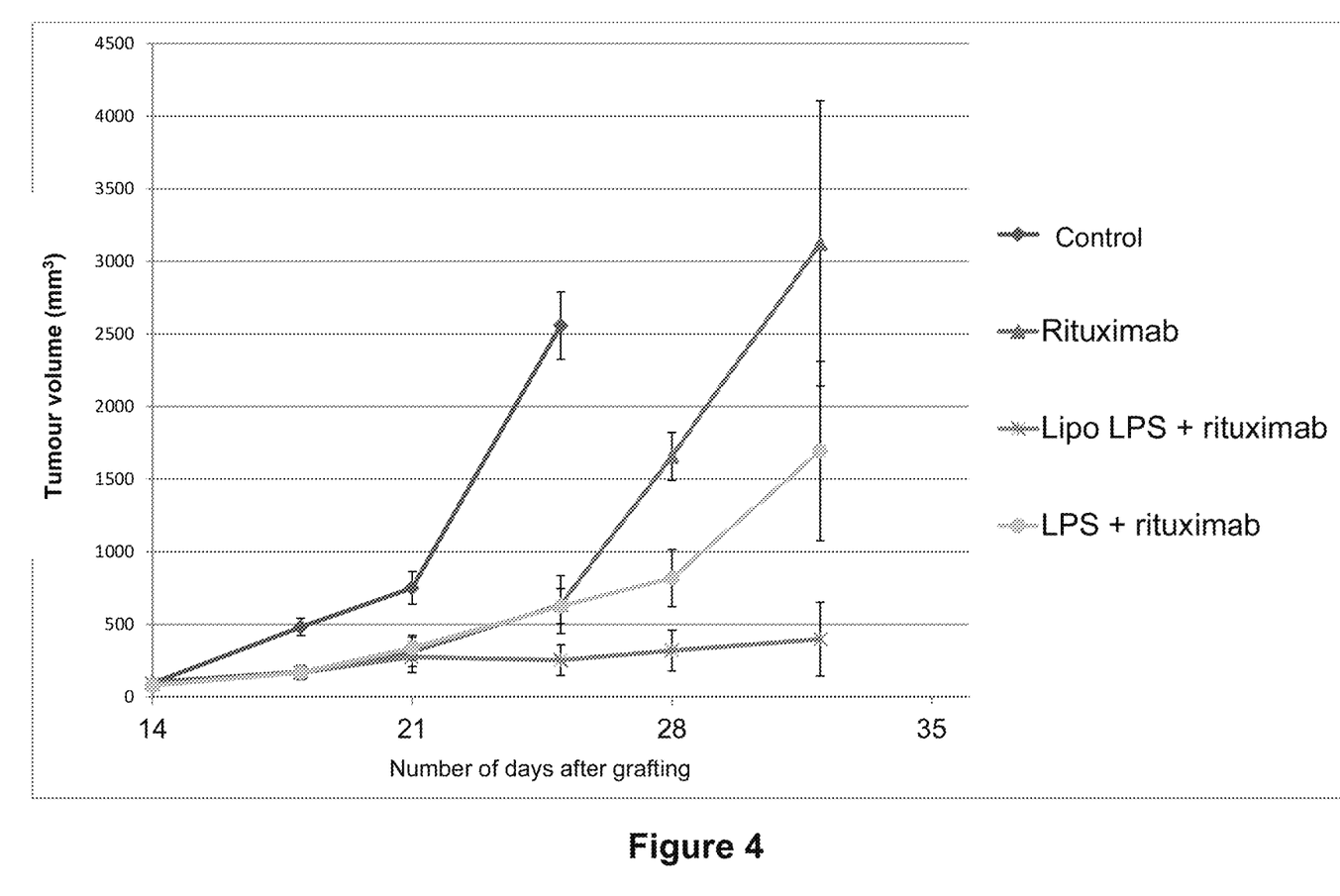
FIG. 4. Monitoring of tumour volumes of RL lymphoma xenografted mice treated with (i) Rituximab, (ii) a combination of Rituximab with a LPS liposomal formulation, or (iii) a combination of Rituximab with non-encapsulated LPS.

FIG. 4 shows the difference observed between mice treated with this combination product, and mice treated with a combination product comprising rituximab and LPS non-encapsulated in liposomes: the LPS liposomal formulation is more efficient to inhibit tumour development.

According to another implementation of the invention, the cytotoxic compound is chosen from the following compounds:
conventional cytotoxic agents (chemotherapy agents) such as:
alkylating agents and the like such as cyclophosphamide, busulfan, melphalan, ifosfamide, bendamustine, temozolomide, bleomycin, mechloretamine, carmustine, fotemustine, BCNU;
platinum derivatives such as cisplatin, oxaliplatin, carboplatin,
nucleoside analogs, nucleobases and other anti-metabolites such as aracytin, fludarabine, cladribine, clofarabine, gemcitabine, 5-fluorouracile, capecitabine, methotrexate, pemetrexed, 6-mercaptopurine, decitabine, azacytidine, troxacitabine,
anti-tubulin agents such as vincristine, vinblastine, vindesine, vinorelbine, vinflunnine, paclitaxel, docetaxel, cabazitaxel, epothilones, eribulin, micronised paclitaxel,
anti-topoisomerase 2 agents such as etoposide, teniposide, irinotecan, camptothecin, doxorubicin, daunorubicin, idarubicin, mitoxantrone, dactinomycin;
targeted therapy agents of the kinase inhibitor type such as imabinib, dasatinib, bosutinib, nilotinib, ponatinib, ibrubinib, idelalisib, afatinib, erlotinib, gefitinib, lapatinib, crizotinib, ruxolitinib, tofacitinib, axitinib, cabozantinib, nindetanib, pazopanib, vandetanib, regorafenib, sorafenib, sunitinib, dabrafenib, trametinib, vemurafenib;
immunomodulators such as thalidomide, lenalidomide, pomalidomide;

apoptosis enablers facilitators such as venetoclax or navitoclax;

anti-tumour agents such as bortezomib, carfilzomib, ixazomib, vorinostat, panobinostat, romidepsin, all-trans retinoic acid, arsenic derivative As2O3, temsirolimus, olaparib, rucaparib, pentostatin, asparaginase, hydroxyurea, and chloraminophene.

According to a preferred implementation of the invention, the cytotoxic compound is a chemotherapy agent.

It is intended that the abovementioned compounds could be used under their usual form, in particular as salts. For example, etoposide could be used as an epotoside phosphate.

Example 4 of the present application demonstrates that LPS encapsulated in liposomes, used in combination with etoposide (5 µM), enables cell death of cancer cells in vitro to be caused, according to a synergist mode.

Indeed, etoposide, a conventionally used chemotherapy agent, induces cancer cell apoptosis, as expected; on the other hand, the LPS liposomal formulation stimulates macrophages, thus inducing tumour cells lysis; and the combined effect of both components enables a cell death rate much higher than the sum of both effects of each component used separately to be achieved.

The present invention also relates to a pharmaceutical combination product as shown above, for use in anti-tumour therapy.

In particular, said pharmaceutical combination product will be used to treat a liquid tumour or a solid tumour.

Said tumour could in particular be chosen from the group consisting of: a breast tumour, a lung tumour, a skin tumour (melanoma), a blood tumour (leukemia), a bone tumour and a lymphoma.

More precisely, the present invention relates to said pharmaceutical combination product for simultaneous, separate or sequential use in anti-tumour therapy. In other words, the use of each component of said combination product could be simultaneous, separate or sequential.

More particularly, it relates to a pharmaceutical combination product as shown above, for simultaneous, separate or sequential use in anti-tumour immunotherapy.

The present invention also relates to a method for therapeutic treating a tumour, comprising administrating to a patient having said tumour, at least one cytotoxic compound and a liposomal formulation exclusively containing a LPS, said administration being made in a simultaneous, separate or sequential way.

The present invention relates also to a kit comprising:
a liposomal formulation exclusively containing a LPS; and
at least one cytotoxic compound such as defined above.

Said cytotoxic compound could be in particular a chemotherapy agent or a therapeutic antibody.

EXAMPLES

Example 1. Preparation, Analysis and Characterisation of the Liposomal Formulations in which the LPS Molecules (LPS Extracted and Purified from *Escherichia coli* O55:B5) are Encapsulated: Liposomes-LPS The formulations of liposomes-LPS have been synthesised according to the following procedure:
lipid composition of the liposomal formulation: DOPE:DSPE-PEG 5000:DSPE-PEG-350:Chol (54:8:8:30% mol)
dissolving the lipids in a chloroform/methanol mixture (9:1)
preparing the lipid film after evaporating the organic solvents. The evaporation is performed using a rotary evaporator
the hydration of the lipid film is performed by adding PBS (buffered saline solution) containing 100 µg LPS/mL in the flask placed in a rotary evaporator, without vacuum.
to improve the encapsulation rate, a freeze (in liquid nitrogen)-thaw (in warm water) series is applied to the suspension of liposomes-LPS.

Extruding the solution of liposomes-LPS enables liposomes with a homogeneous size to be obtained. To this end, the solutions of liposomes-LPS are filtered on 800, 400 and 200 nm polycarbonate membranes. After 5 runs on each filter, the liposome size is homogeneous and the solution of liposomes-LPS is translucent.

The analysis of size (mean diameter), polydispersity (PDI) and charge of liposomal preparations has been performed by dynamic light scattering using a ZetasizerNano-S from Malvern instruments (Worcestershire, UK). The analysis on 3 months of two liposomal preparations allowed stability of these preparations to be demonstrated (table 1).

TABLE 1

|  | Measurements made at | Size (nm) | Polydispersity (PDI) | Osmolarity (mOsm/kg) | Zeta potential (mv) |
| --- | --- | --- | --- | --- | --- |
| Liposomal preparation containing LPS | D 0 | 133 | 0.09 | 309 | −3.63 |
|  | D 0 + 30 d | 132 | 0.09 | 308 | −3.67 |
|  | D 0 + 60 d | 133 | 0.111 | 311 | ND |
|  | D 0 + 90 d | 134 | 0.098 | 310 | −6.13 |

The in vitro analysis of the interaction of liposomal formulations thus produced (involving a fluorescent component) with human blood white blood cells allowed a strong interaction of liposomes with granulocytes and monocytes to be demonstrated. The interaction with the lymphocytic fraction has not been observed (results not shown).

Additionally, the incubation of the human blood white blood cells with the liposomes-LPS and the analysis by flow cytometry enabled us to emphasise the activation of the phagocyte activity.

The confocal microscopy analysis of the rhodamine B-labelled liposomes-LPS formulations and in which the LPS molecules are coupled to the fluorochrome FITC allowed us to emphasise the incorporation of LPS into liposomal particles. Finally, the homogeneity of liposomal particles has been validated by electron microscopy after negative staining.

Example 2. Preclinical Evaluation of the Adjuvant Effect of the LPS Liposomal Formulations on the Rituximab Activity in a RL Cells Xenografted Mice Model During this experiment, six groups of Scid CB17 mice have been used. Each group is comprised at six mice.

Group 1=control (no treatment)

Group 2=Empty liposomes

Group 3=0.5 mg/mL LPS

Group 4=30 mg/kg Rituximab

Group 5=0.5 mg/kg Liposomes-LPS

Group 6=0.5 mg/kg Liposomes-LPS+30 mg/kg Rituximab

The monitoring of tumour growth after injecting the different treatments at a rate of one injection per week enabled the rituximab anti-tumour activity potentiator effect to be demonstrated by the preparation of liposomes-LPS. This potentiator effect was reflected in a significant reduction in the tumour growth after the Rituximab and liposomes-LPS combination in comparison with the group of mice treated by the rituximab alone (FIG. 1).

The analysis of the effect of the different treatments on the spleen size after sacrificing the animals enabled a significant increase in the spleen size and weight to be emphasised in the case of animals treated by the liposomes-LPS and the Rituximab and Liposomes-LPS combination in comparison with animals from other groups (FIG. 2).

NK cells are innate immunity cells which are known to play an important role in anti-tumour responses.

The flow cytometry analysis of the effect of the different treatments on the white blood cell sub-populations at the spleen enabled the significant increase in the number of Natural Killer (NK) cells to be emphasised in the spleen of animals treated by the liposomes-LPS and Rituximab and Liposomes-LPS combination in comparison with animals from other groups (FIG. 3 shows the percentage of NK cells relative to all the white blood cells in the sample).

FIG. 4 shows, in the same animal model of SCID mice grafted with RL lymphoma cells, the compared effects obtained with the administration, once a week, of:
rituximab (30 mg/kg)
rituximab and "conventional" LPS of E. coli (0.5 mg/kg)
rituximab and LPS liposomal formulation, at the same doses as previously.

The latter rituximab and encapsulated LPS combination enables the best inhibition in the development of the tumour after its grafting to be achieved.

Example 3. Anti-Tumour Action of the LPS Liposomal Formulation in Xenograft Models of Solid Tumours The anti-tumour action of the LPS liposomal formulation has also been shown in another animal model of tumours, SCID mice xenografted with breast cancer tumour cells: the MDA-MB-231 cells.

The results shown in FIG. 5 show the progression of the tumour volume over time, as a function of the treatments administrated to the mice:
Group 1: untreated control mice (3 mice);
Group 2: mice treated by the intravenous administration of the LPS liposomal formulation.

The tumour growth monitoring after injecting the different treatments at a rate of one injection per week enabled the anti-tumour activity of the liposomes-LPS preparation to be demonstrated. This activity was reflected by a significant reduction in the tumour growth after injecting the liposomes-LPS in comparison with the group of untreated mice.

Example 4. In Vitro Effects of a Combination Product According to the Invention on the Cell Death Rate of SaOS Cells The SaOS cells are rat osteosarcoma cells. This is a malignant bone tumour. These cells can be cultured according to a 3D spheroid model adapted to tumour cells.

THP-1 are human monocytic cells derived from an acute monocytic leukemia.

To perform cellular death monitoring of these SaOS cells, the fluorescent product IncuCyte® Caspase-3/7 has been used to evaluate the number of apoptosis cells.

The cells have been treated according to the protocol shown in the following table 2:

TABLE 2

| Treatment protocol of the THP-1 effector cells and the target SaOS cells | | |
|---|---|---|
| Days | THP-1 effector cells | Target Saos cells |
| D 0 | Activation of THP-1 cells in macrophages: treatment with 150 nM PMA (phorbol myristate acetate) for 24 hours | The Saos cells are placed in 96-well plates (2500 cells/well) to initiate spheroid growth |
| D 1 | Change of culture medium | |
| D 2 | Activation of THP-1 with an incubation for 16 hours in the presence of 100 ng/ Lipo-LPS | |
| D 3 | | Mix of the activated THP-1 cells and target cells: target/effector ratio = 1/3 +5 µM etoposide +2.5 mM final Green casp 3/7 fluorescent compound Incubation 30 minutes at room temperature and then observation under microscope after development by Incucyte ®, every three hours |

Figure 6:
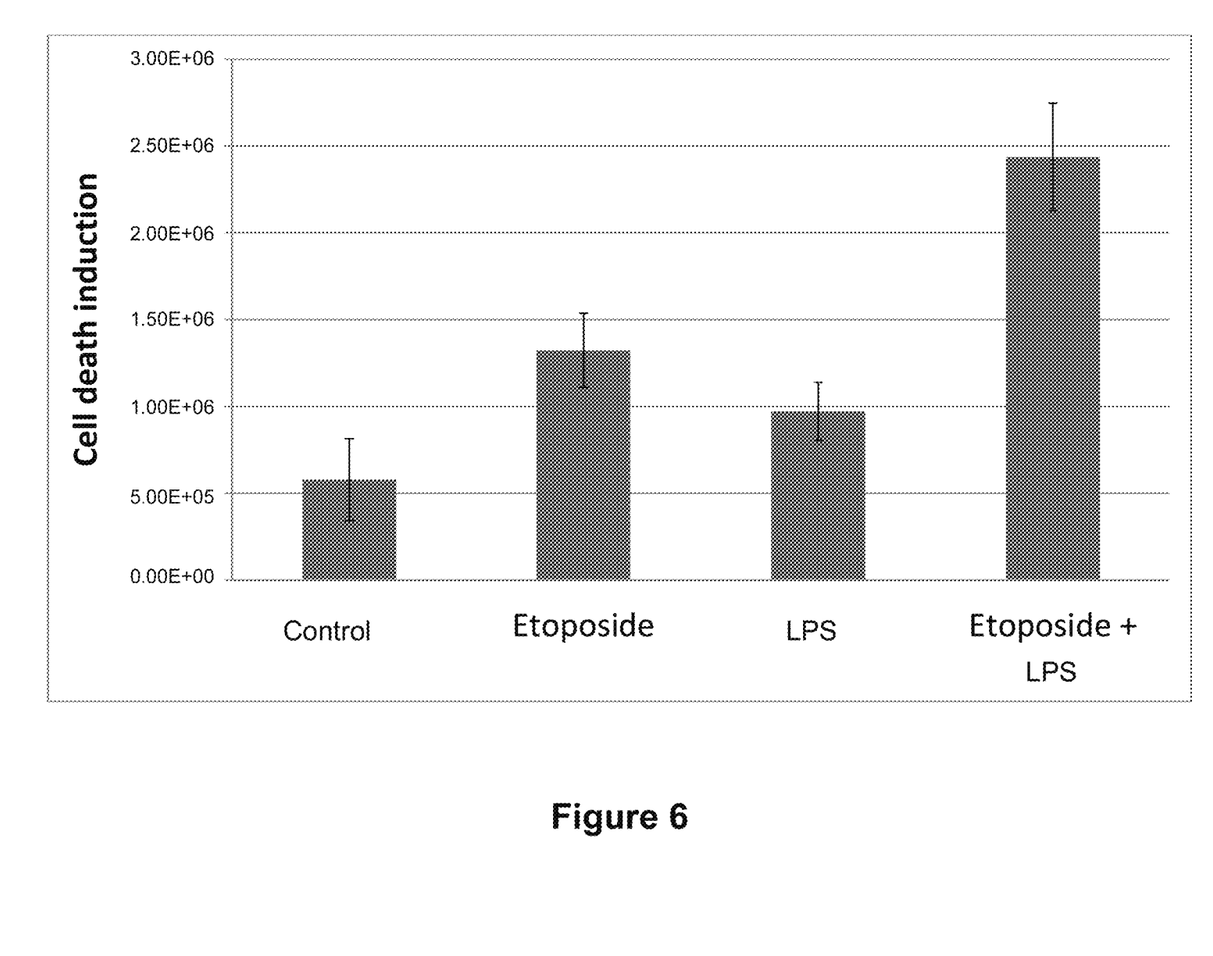
FIG. 6. Rat osteosarcoma cells cultured in vitro, incubated with:
 macrophages stimulated for 16 h with 100 ng/mL Lipo-LPS WO (LPS-Biosciences), or
 5 µM etoposide, or
 a combination of both.

The results are shown in FIG. 6, in fluorescence arbitrary units.

The control cells have a small residual apoptosis rate.

Cells treated with epotoside have an apoptosis rate significantly increased with respect to the control ($p<0.05$). Cells treated with a LPS liposomal formulation have a similar rate.

The association of both compounds: epotoside and liposomal formulation, enables an apoptosis rate significantly increased with respect to that obtained for each of the compounds used alone to be achieved, thus demonstrating the synergist effect of both compounds on the target cancer cells.

REFERENCES

Patent

WO 2013/129936

Bibliographic Citations

Bakouche O, Koff W C, Brown D C, Lachman L B. *Interleukin 1 release by human monocytes treated with liposome-encapsulated lipopolysaccharide*. J. Immunol. 1987 Aug. 15; 139(4):1120-6.

Dijkstra J, Mellors J W, Ryan J L. *Altered in vivo activity of liposome-incorporated lipopolysaccharide and lipid A*. Infect Immun. 1989 November; 57(11):3357-63.

Neidhart J, Allen K O, Barlow D L, Carpenter M, Shaw D R, Triozzi P L, Conry R M. *Immunization of colorectal cancer patients with recombinant baculovirus-derived*

*KSA (Ep-CAM) formulated with monophosphoryl lipid A in liposomal emulsion, with and without granulocyte-macrophage colony-stimulating factor.* Vaccine. 2004 Jan. 26; 22(5-6):773-80.

The invention claimed is:

1. A pharmaceutical combination product for a human comprising:
   a liposomal formulation consisting of one or more liposomes each encapsulating only a bacterial lipopolysaccharide (LPS) as a single active ingredient and containing no antigen; and
   at least one cytotoxic compound chosen from the group consisting of:
      the therapeutic antibody rituximab,
         a chemotherapeutic agent chosen from the group consisting of:
      etoposide and doxorubicin.

2. The pharmaceutical combination product according to claim 1, characterized in that the bacterial lipopolysaccharide is from a bacterium of the Enterobacteriaceae family.

3. The pharmaceutical combination product according to claim 1, characterized in that the bacterial lipopolysaccharide consists of its lipid A.

4. A method for treating a tumor comprising administering to a human patient having said tumor an effective amount of a liposomal formulation consisting of:
   (1) one or more liposomes each encapsulating only a bacterial lipopolysaccharide as a single active ingredient and containing no antigen; and
   (2) at least one cytotoxic compound chosen from the group consisting of:
      the therapeutic antibody rituximab,
         a chemotherapy agent chosen from the group consisting of: etoposide and doxorubicin.

5. The method according to claim 4, characterized in that the tumor is a liquid tumor or a solid tumor.

6. The method according to claim 4, characterized in that the tumor is chosen from the group consisting of: a breast tumor, a lung tumor, a skin tumor (melanoma), a blood tumor (leukemia), a bone tumor, and a lymphoma.

7. The method according to claim 4, characterized in that the administration of said liposomal formulation and said at least one cytotoxic compound is simultaneous, separate, or sequential.

8. The method according to claim 4, characterized in that the liposomal formulation is suitable for systemic administration.

9. The pharmaceutical combination product according to claim 1, characterized in that the bacterial lipopolysaccharide is from the *Escherichia* genus.

10. The pharmaceutical combination product according to claim 1, characterized in that the bacterial lipopolysaccharide is from the *Escherichia coli* species.

11. The pharmaceutical combination product according to claim 1, characterized in that the cytotoxic compound is the therapeutic antibody rituximab.

12. The pharmaceutical combination product according to claim 1, characterized in that the cytotoxic compound is etoposide.

13. The method according to claim 4, characterized in that the cytotoxic compound is the therapeutic antibody rituximab.

14. The method according to claim 4, characterized in that the cytotoxic compound is etoposide.

15. The pharmaceutical combination product according to claim 1, characterized in that the administration of each component of the pharmaceutical combination product is simultaneous, separate, or sequential.

* * * * *